US011053792B2

(12) United States Patent
Williams et al.

(10) Patent No.: US 11,053,792 B2
(45) Date of Patent: *Jul. 6, 2021

(54) PREDICTING WELLBORE OPERATION PARAMETERS

(71) Applicant: Halliburton Energy Services, Inc., Houston, TX (US)

(72) Inventors: Robert Lynn Williams, Spring, TX (US); Aidan James Porter, Lancashire (GB); Vitor Lopes Pereira, The Woodlands, TX (US); Joshua Samuel Gollapalli, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 385 days.

This patent is subject to a terminal disclaimer.

(21) Appl. No.: 15/744,387

(22) PCT Filed: Aug. 27, 2015

(86) PCT No.: PCT/US2015/047278
§ 371 (c)(1),
(2) Date: Jan. 12, 2018

(87) PCT Pub. No.: WO2017/034586
PCT Pub. Date: Mar. 2, 2017

(65) Prior Publication Data
US 2018/0202285 A1 Jul. 19, 2018

(51) Int. Cl.
*G01V 1/50* (2006.01)
*E21B 47/13* (2012.01)
(Continued)

(52) U.S. Cl.
CPC ............. *E21B 47/13* (2020.05); *E21B 21/08* (2013.01); *E21B 44/00* (2013.01); *G01V 1/50* (2013.01); *G01V 2200/16* (2013.01)

(58) Field of Classification Search
CPC .......... E21B 21/08; E21B 47/00; E21B 47/12; G01V 1/50; G05B 13/048
See application file for complete search history.

(56) References Cited

U.S. PATENT DOCUMENTS 6,665,117 B2 * 12/2003 Neff .................. G01V 1/34
345/419
7,316,278 B2 1/2008 Hutchinson
(Continued)

FOREIGN PATENT DOCUMENTS

| CA | 2634328 | 8/2011 |
| CA | 2634470 | 5/2013 |

(Continued)

OTHER PUBLICATIONS

Holst et al., "Deviation Detection of Industrial Processes", ERCIM News No. 56, Jan. 2004, 2 pages.
(Continued)

*Primary Examiner* — Elias Desta
(74) *Attorney, Agent, or Firm* — Kilpatrick Townsend & Stockton LLP

(57) ABSTRACT

A system for use in a wellbore can include a computing device that includes a processing device and a memory device that stores instructions executable by the processing device. The instructions can cause the processing device to generate a predicted value of a parameter associated with a well environment or with a wellbore operation. The instructions can also cause the processing device to receive sensor data that includes a measured value of the parameter; compare the predicted value to the measured value to determine a difference; and generate an interface for display that includes a data point associated with the difference plotted on a probability-mass distribution graph. The system can also include a sensor in electrical communication with the computing device and positionable proximate to the (Continued)

wellbore for generating the measured value of the parameter and transmitting the measured value of the parameter to the computing device.

20 Claims, 8 Drawing Sheets

(51) Int. Cl.
*E21B 44/00* (2006.01)
*E21B 21/08* (2006.01)

(56) References Cited

U.S. PATENT DOCUMENTS

| | | | |
|---|---|---|---|
| 7,346,456 | B2 | 3/2008 | Le Bemadjiel |
| 7,357,196 | B2 | 4/2008 | Goldman et al. |
| 7,725,302 | B2 | 5/2010 | Ayan et al. |
| 7,896,105 | B2 | 3/2011 | Dupriest et al. |
| 7,953,587 | B2 | 5/2011 | Bratton et al. |
| 8,527,249 | B2 | 9/2013 | Jamison et al. |
| 8,818,779 | B2 | 8/2014 | Sadlier et al. |
| 8,996,346 | B2 | 3/2015 | Zuo et al. |
| 9,175,557 | B2 | 11/2015 | Iversen et al. |
| 9,187,088 | B1 * | 11/2015 | Ferguson ............. G05D 1/0088 |
| 9,784,089 | B2 | 10/2017 | Boone et al. |
| 10,113,910 | B2 * | 10/2018 | Brunk .................... G01J 3/2823 |
| 2005/0216197 | A1 * | 9/2005 | Zamora .................... G01V 1/34 702/6 |
| 2005/0279532 | A1 | 12/2005 | Ballantyne et al. |
| 2007/0179767 | A1 | 8/2007 | Cullick et al. |
| 2011/0125476 | A1 | 5/2011 | Craig |
| 2013/0124171 | A1 | 5/2013 | Schuette et al. |
| 2013/0222390 | A1 | 8/2013 | Ross et al. |
| 2014/0076632 | A1 | 3/2014 | Wessling et al. |
| 2014/0083681 | A1 | 3/2014 | Taylor et al. |
| 2014/0326449 | A1 | 11/2014 | Germain et al. |
| 2015/0081265 | A1 | 3/2015 | Hantschel et al. |
| 2015/0226049 | A1 | 8/2015 | Frangos et al. |
| 2016/0273346 | A1 | 9/2016 | Tang et al. |
| 2018/0216443 | A1 * | 8/2018 | Williams ................ E21B 44/00 |

FOREIGN PATENT DOCUMENTS

| | | |
|---|---|---|
| WO | 2013119480 | 8/2013 |
| WO | 2015060865 | 4/2015 |
| WO | 2017034587 | 3/2017 |
| WO | 2017034588 | 3/2017 |

OTHER PUBLICATIONS

International Patent Application No. PCT/US2015/047278, "International Search Report and Written Opinion", dated May 19, 2016, 11 pages.
International Patent Application No. PCT/US2015/047287, "International Search Report and Written Opinion", dated May 19, 2016, 14 pages.
International Patent Application No. PCT/US2015/047289, "International Search Report and Written Opinion", dated May 19, 2016, 11 pages.
Vachkov et al., "Detection of Deviation in Performance of Battery Cells by Data Compression and Similarity Analysis", International Journal of Intelligent Systems, vol. 29, 2014, pp. 207-222.
U.S. Appl. No. 15/744,620, Non-Final Office Action, dated Feb. 24, 2020, 7 pages.
U.S. Appl. No. 15/744,620, Notice of Allowance, dated Jun. 18, 2020, 8 pages.
U.S. Appl. No. 15/747,017, Non-Final Office Action, dated Jun. 25, 2020, 13 pages.
Canadian Application No. CA 2,991,573, Office Action, dated Oct. 16, 2019, 5 pages.
Canadian Application No. CA2,992,704, Office Action, dated Dec. 12, 2019, 5 pages.
Canadian Application No. CA2,992,710, Office Action, dated Dec. 12, 2019, 4 pages.
David et al., "Achieving Drilling Excellence through Next Generation Workflows Enabled by Integrating Historical Drilling Data and Real Time Data", Society of Petroleum Engineers, Nov. 10-13, 2014, pp. 1-11.
Golden et al., "Fault Diagnostics Using Expert Systems", 30th Aerospace Sciences Meeting and Exhibit, Jan. 6-9, 1992, pp. 1-6.
Nybo et al., "The Overlooked Drilling Hazard: Decision Making From Bad Data", Society of Petroleum Engineers Intelligent Energy International, Mar. 27-29, 2012, pp. 1-8.

* cited by examiner

PREDICTING WELLBORE OPERATION PARAMETERS

CROSS-REFERENCE TO RELATED APPLICATIONS

This application is related to International Patent Application No. PCT/US2015/047287 titled "Tuning Predictions of Wellbore Operation Parameters," and International Patent Application No. PCT/US2015/047289 titled "Determining Sources of Erroneous Downhole Predictions," both of which were filed with the U.S. Receiving Office of the PCT on Aug. 27, 2015. The entirety of both Applications are hereby incorporated herein by reference.

TECHNICAL FIELD

The present disclosure relates generally to devices for use with well systems. More specifically, but not by way of limitation, this disclosure relates to a system for predicting wellbore operation parameters.

BACKGROUND

A well system (e.g., oil or gas wells for extracting fluid or gas from a subterranean formation) can include a wellbore. Various well tools can be used for performing operations in the wellbore. It can be desirable to predict a characteristic or effect of a wellbore operation prior to performing the wellbore operation. For example, it can be desirable to predict an amount of pressure generated by a drilling operation. It can be challenging to accurately predict the characteristics of the wellbore operation.

DETAILED DESCRIPTION

Certain aspects and features of the present disclosure relate to a system for predicting a parameter associated with a wellbore operation and comparing the predicted parameter to real time data from a sensor in the wellbore. The system can output a result of the comparison via a graph or another visual user interface. For example, the system can plot a point associated with the result on a probability-mass distribution graph. A well operator can visually inspect the probability-mass distribution graph to determine the accuracy of the prediction and confidently rely on future predicted parameters for making decisions with respect to wellbore operations.

In some examples, the system can determine the accuracy of the predictions based on a mean or a standard deviation of the data points on the probability-mass distribution graph. For example, the system can determine that the predictions are sufficiently accurate in response to the standard deviation exceeding a threshold. The system can determine that the predictions are not accurate in response to the standard deviation falling below the threshold.

In some examples, the system can update a visual characteristic (e.g., a color, shape, thickness, or any combination of these) of one or more data points on the probability-mass distribution graph based on the respective ages of the data points. For example, the system can use different colors to represent the different ages of the data points. These visual indicators of age can allow the well operator to detect slight changes in the probability-mass distribution graph (e.g., changes in probability-mass distribution trends) that the well operator may otherwise be unable to detect. For example, the mean of the probability-mass distribution graph can slightly change as new data points are added to the probability-mass distribution graph over time. For example, the mean of the probability-mass distribution curve can change from 0.03258 lbs/gallon to 0.03336 lbs/gallon. Without the visual indicators, this small a change can be undetectable to the well operator upon visual inspection of the probability-mass distribution graph. The visual indicators, however, can highlight for the well operator that the change is occurring or has occurred. The change can provide a basis for the well operator to halt or otherwise modify well operations.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
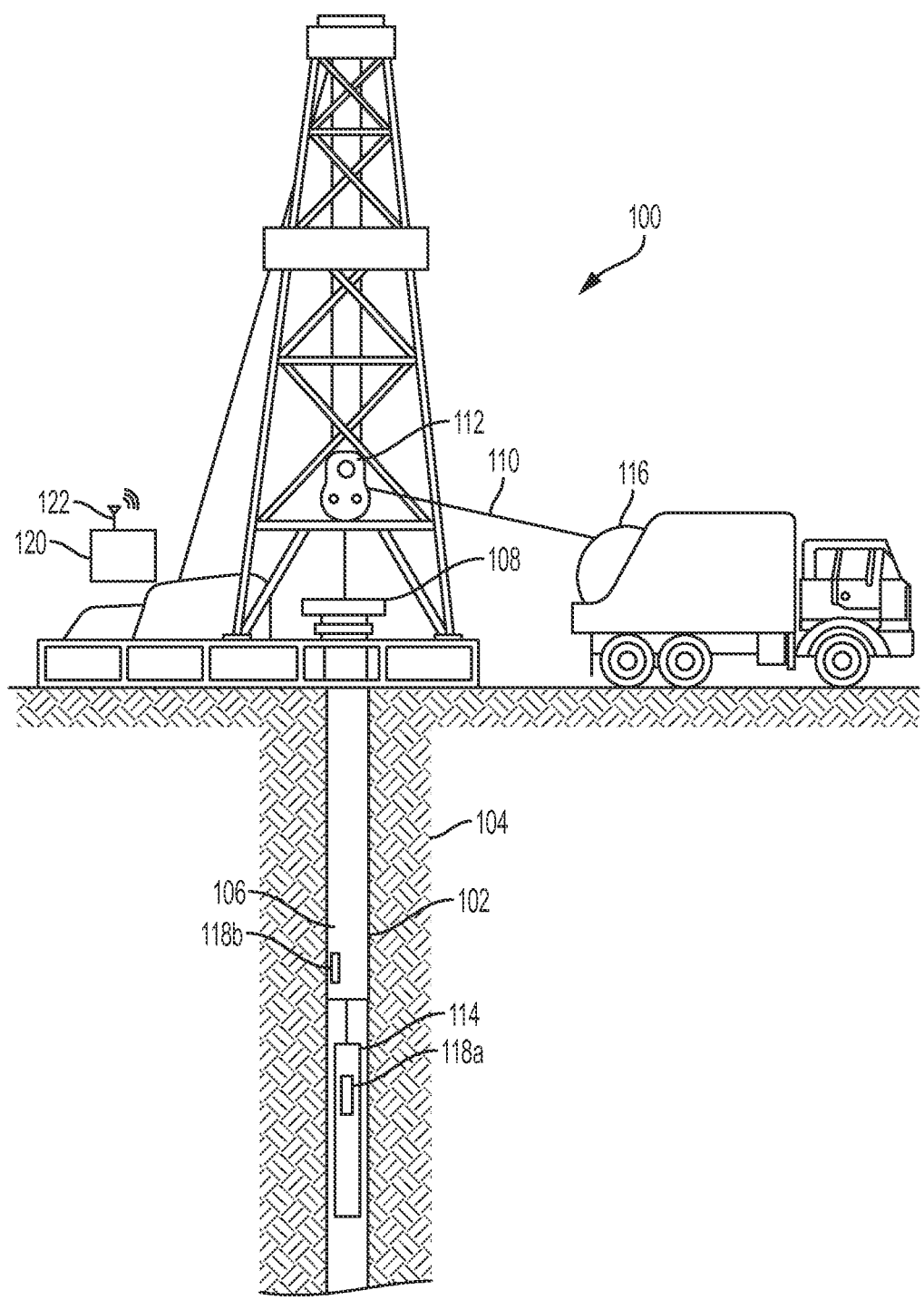
FIG. 1 is a cross-sectional view of an example of a well system that includes a system for predicting wellbore operation parameters according to some aspects.

FIG. 1 is a cross-sectional view of an example of a well system 100 that includes a system for predicting wellbore operation parameters according to some aspects. The well system 100 includes a wellbore 102 extending through various earth strata. The wellbore 102 extends through a hydrocarbon bearing subterranean formation 104. A casing string 106 extends from the surface 108 to the subterranean formation 104. The casing string 106 can provide a conduit through which formation fluids, such as production fluids produced from the subterranean formation 104, can travel from the wellbore 102 to the surface 108.

The well system 100 can also include at least one well tool 114 (e.g., a formation-testing tool). The well tool 114 can be coupled to a wireline 110, slickline, or coiled tube that can be deployed into the wellbore 102. The wireline 110, slickline, or coiled tube can be guided into the wellbore 102 using, for example, a guide 112 or winch. In some examples, the wireline 110, slickline, or coiled tube can be wound around a reel 116.

The well system 100 includes one or more sensors 118a-b. The sensors 118a-b can detect one or more parameters associated with an environment in the wellbore 102, a wellbore operation (e.g., the operation of the well tool 114 in the wellbore 102), or both and transmit associated sensor data to a computing device 120. The sensors 118a-b can be positioned in the well tool 114, the casing string 106, or elsewhere in the well system 100. The sensors 118a-b can be of the same type or can be different. Examples of the sensors 118a-b can include a pressure sensor, a temperature sensor, a microphone, an accelerometer, a depth sensor, a resistivity sensor, a vibration sensor, a fluid analyzer or detector, an ultrasonic transducer, or any combination of these.

The well system 100 can include the computing device 120. The computing device 120 can be positioned at the surface 108, below ground, or offsite. The computing device 120 can include a processor interfaced with other hardware via a bus. A memory, which can include any suitable tangible (and non-transitory) computer-readable medium, such as RAM, ROM, EEPROM, or the like, can embody program components that configure operation of the computing device 120. In some aspects, the computing device 120 can include input/output interface components (e.g., a display, keyboard, touch-sensitive surface, and mouse) and additional storage.

The computing device 120 can communicate with the sensors 118a-b via a communication device 122. The communication device 122 can represent one or more of any components that facilitate a network connection. In the example shown in FIG. 1, the communication device 122 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other examples, the communication device 122 can be wired and can include interfaces such as Ethernet, USB, IEEE 1394, or a fiber optic interface. An example of the computing device 120 is described in greater detail with respect to FIG. 3.

In some examples, the computing device 120 can predict a parameter associated with the environment in the wellbore 102 or a wellbore operation (e.g., operating the well tool 114 in the wellbore 102). The wellbore operation can include running a tubular (e.g. pipe) into the wellbore 102, removing the tubular from the wellbore 102, circulating a fluid through the wellbore 102, cleaning the wellbore 102, making a connection between two well system components (e.g., two well tools or tubulars), a drilling operation (e.g., slide drilling or rotary drilling), idling, and/or any other operation occurring in the wellbore 102. The sensors 118a-b can measure the parameter and transmit associated sensor data to the computing device 120. The computing device 120 can receive the sensor data and compare the predicted parameter to the measured parameter to determine a difference between the two. The computing device 120 can plot a data point representative of the difference between the two on a graph, such as a probability-mass distribution graph. The computing device 120 can iterate this process (e.g., in real time) to plot multiple data points on the graph. In some examples, a well operator can visually inspect the graph to determine the accuracy of one or more predicted parameters. Additionally or alternatively, the computing device 120 can analyze the graph or the associated data points to determine the accuracy of one or more predicted parameters.

Figure 2:
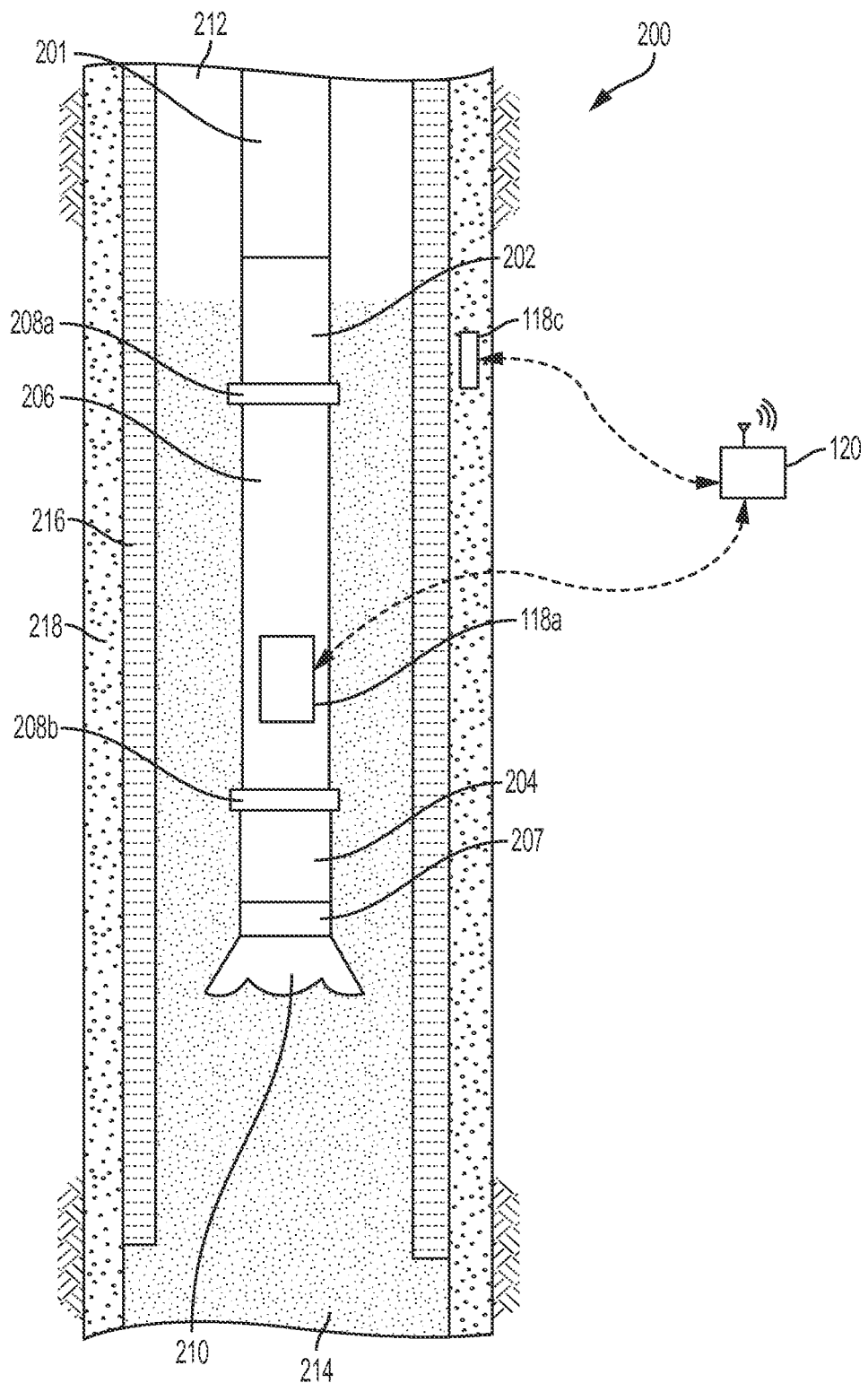
FIG. 2 is a cross-sectional view of an example of a part of a well system that includes a system for predicting wellbore operation parameters according to some aspects.

FIG. 2 is a cross-sectional view of an example of a well system 200 that includes a system for wellbore operation parameters according to some aspects. In this example, the well system 200 includes a wellbore. The wellbore can include a casing string 216 and a cement sheath 218. In some examples, the cement sheath 218 can couple the casing string 216 to a wall of the wellbore. In some examples, the wellbore can include fluid 214. An example of the fluid 214 can include mud. The fluid 214 can flow in an annulus 212 positioned between a well tool 201 and a wall of the casing string 216.

The well tool 201 can be positioned in the wellbore. In some examples, the well tool 201 is a measuring-while-drilling tool. For example, the well tool 201 can include a logging-while-drilling tool, a pressure-while-drilling tool, a temperature-while-drilling tool, or any combination of these. The well tool 201 can include various subsystems 202, 204, 206, 207. For example, the well tool 201 can include a subsystem 202 that includes a communication subsystem. The well tool 201 can also include a subsystem 204 that includes a saver subsystem or a rotary steerable system. A tubular section or an intermediate subsystem 206 (e.g., a mud motor or measuring-while-drilling module) can be positioned between the other subsystems 202, 204. The well tool 201 can include a drill bit 210 for drilling the wellbore. The drill bit 210 can be coupled to another tubular section or intermediate subsystem 207 (e.g., a measuring-while-drilling module or a rotary steerable system). In some examples, the well tool 201 can include tubular joints 208a-b. Tubular joints 208a-b can allow the well tool 201 to bend or can couple various well tool subsystems 202, 204, 206 together.

The well system 200 includes one or more sensors 118a, 118c. The sensors 118a, 118c can be of the same type or can be different. The sensors 118a, 118c can be positioned in the well tool 201, the cement sheath 218, or elsewhere in the well system 200. The sensors 118a, 118c can communicate with computing device 120 via a wired or wireless interface.

The computing device 120 can compare sensor data from the sensors 118a, 118c with predicted parameters (of an environment in the wellbore or the operation of the well tool 201) to determine differences between the two. The computing device 120 can output the differences via a visual user interface, such as on a graph. A well operator can visually inspect the graph to determine the accuracy of the predictions and confidently rely on future predicted parameters for making decisions with respect to wellbore operations.

Figure 3:
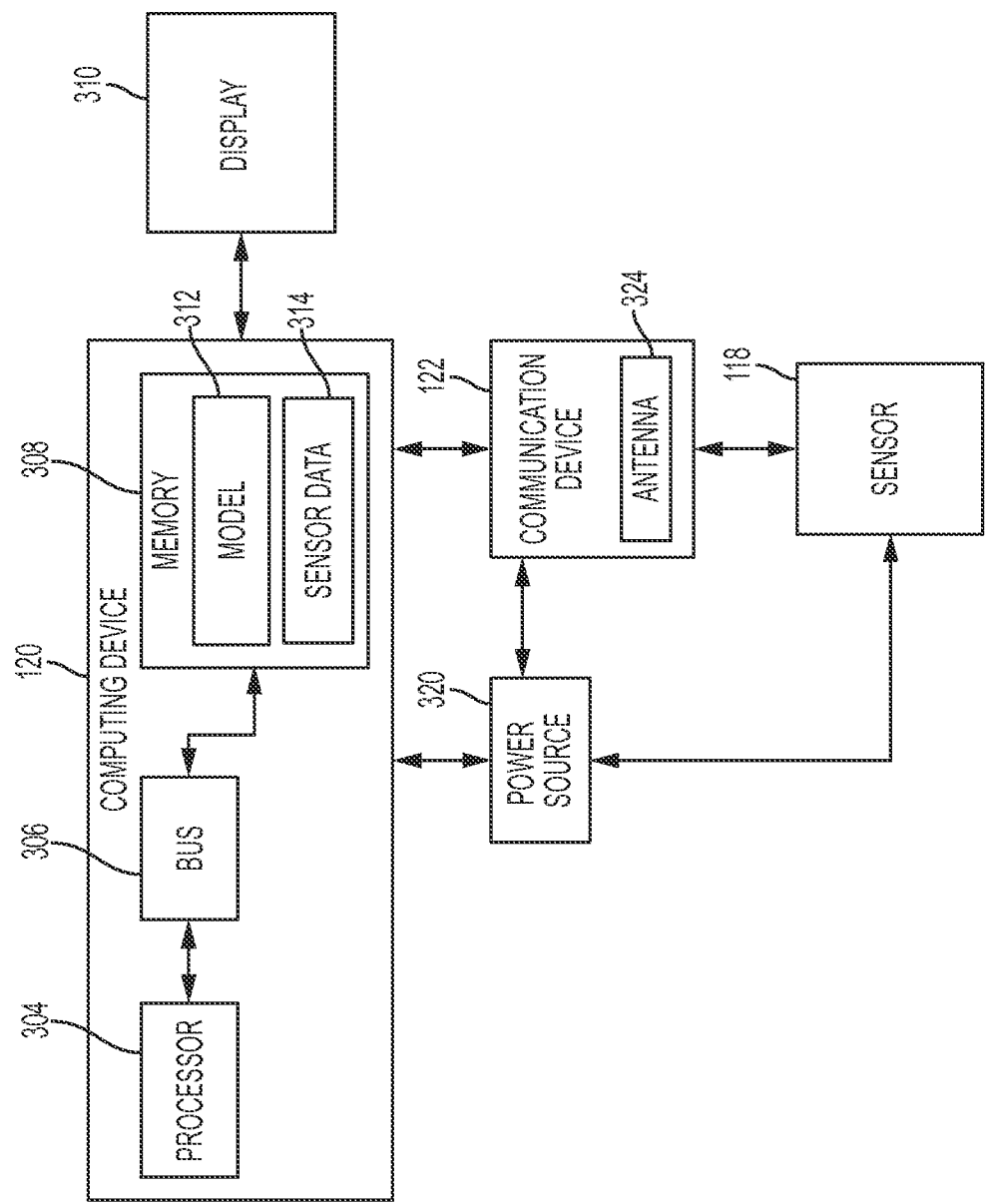
FIG. 3 is a block diagram of an example of a system for predicting wellbore operation parameters according to some aspects.

FIG. 3 is a block diagram of an example of a system for predicting wellbore operation parameters according to some aspects. In some examples, the components shown in FIG. 3 (e.g., the computing device 302, power source 320, display 310, and communication device 122) can be integrated into a single structure. For example, the components can be within a single housing. In other examples, the components shown in FIG. 3 can be distributed (e.g., in separate housings) and in electrical communication with each other.

The computing device 120 a processor 304, a memory 308, and a bus 306. The processor 304 can execute one or more operations for predicting wellbore operation parameters. The processor 304 can execute instructions stored in the memory 308 to perform the operations. The processor 304 can include one processing device or multiple processing devices. Non-limiting examples of the processor 304 include a Field-Programmable Gate Array ("FPGA"), an application-specific integrated circuit ("ASIC"), a microprocessor, etc.

The processor 304 can be communicatively coupled to the memory 308 via the bus 306. The non-volatile memory 308 may include any type of memory device that retains stored information when powered off. Non-limiting examples of the memory 308 include electrically erasable and programmable read-only memory ("EEPROM"), flash memory, or any other type of non-volatile memory. In some examples, at least some of the memory 308 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 308 can include a model 312. The model 312 can include one or more algorithms configured to predict a parameter associated with an environment in a well system or a wellbore operation (e.g., an operation of a well tool). The model 312 can be tuned for specific wellbore operations, such as rotary drilling, slide drilling, pulling a pipe out of a wellbore, running a pipe into the wellbore, circulating fluid through the well system, wellbore cleaning, or any combination of these. In some examples, the model 312 can include the equation:

ECD Value=Total Pressure/(0.052*TVD)

where ECD Value is a predicted ECD value in ppg (pounds per gallon) at a given depth for one or more fluids (e.g., Newtonian or Non-Newtonian fluids) in a wellbore; TVD (true vertical depth) is a vertical depth of a wellbore in feet; and Total Pressure is in psi (pounds per square inch). In some examples, the model 312 can include the following equation for determining the Total Pressure:

Total Pressure=Hydrostatic Pressure+Annular Pressure Loss

In some examples, the model 312 can include the following equation for determining the Hydrostatic Pressure:

Hydrostatic Pressure=0.052*Mud Weight*TVD where hydrostatic pressure is in psi; and Mud Weight is in ppg and can be determined by applying temperature and pressure compressibility and expansion effects to a surface Mud Weight. The surface Mud Weight can be measured using a mud scale. In some examples, the model 312 can include the following equation for determining the Annular Pressure Loss:

Annular Pressure Loss=(4*Wall Shear Stress*Length)/(Outer Diameter−Inner Diameter)

where annular pressure loss is in psi; wall shear stress is in psi and includes a fluid shear stress at a wall of an annulus of the wellbore; length is the length of the annulus of the wellbore in feet; outer diameter is the outer diameter of the annulus of the wellbore in feet; and inner diameter is the inner diameter of the annulus of the wellbore in feet.

In some examples, the computing device 120 can determine an input (e.g., a value for a variable) for an equation (e.g., any of the above equations) based on sensor data 314 from a sensor (e.g., real-time sensor data from sensor 118), data input to the computing device 120 by a well operator, historical data about a well system, or any combination of these. For example, the computing device 120 can receive sensor signals from a mud scale indicative of a surface Mud Weight, extract sensor data 314 from the sensor signals, and store the sensor data 314 in memory 308. The computing device 120 can retrieve the sensor data 314 from memory 308 and use the sensor data 314 as an input to, for example, a Hydrostatic Pressure equation. As another example, the computing device 120 can receive input from a well operator (e.g., indicative of an outer diameter of an annulus of a wellbore) and store the input as data in memory 308. The computing device 120 can retrieve the data from memory 308 and use the data as an input to, for example, an Annular Pressure Loss equation As still another example, the computing device 120 can receive historical data about a well system and store the historical data in memory 308. The computing device 120 can retrieve the historical data and use at least a portion of the historical data as an input for an equation. In some examples, the computing device 120 can analyze the historical data to determine new information about the well system. The computing device 120 can use the new information as an input for an equation.

The memory 308 can also include sensor data 314 from a sensor 118. The sensor 118 can detect the parameter (associated with the environment in the well system or the wellbore operation) and transmit associated sensor signals to the computing device 120. The computing device 120 can receive the sensor signals via communication device 122, extract sensor data 314 from the sensor signals, and store the sensor data 314 in memory 308. Examples of the sensors 118a-b can include a pressure sensor, a temperature sensor, a microphone, an accelerometer, a depth sensor, a resistivity sensor, a vibration sensor, a fluid analyzer or detector, an ultrasonic transducer, or any combination of these.

The computing device 120 can be in electrical communication with the communication device 122. The communication device 122 can include or can be coupled to an antenna 324. In some examples, part of the communication device 122 can be implemented in software. For example, the communication device 122 can include instructions stored in memory 308.

The communication device 122 can receive signals from remote devices (e.g., sensor 118) and transmit data to remote devices. For example, to transmit data to a remote device, the processor 304 can transmit one or more signals to the communication device 122. The communication device 122 can receive the signals from the processor 304 and amplify, filter, modulate, frequency shift, and otherwise manipulate the signals. The communication device 122 can transmit the manipulated signals to the antenna 124, which can responsively generate wireless signals that carry the data.

In some examples, the communication device 122 can transmit data via a wired interface. For example, the communication device 122 can transmit data via a wireline. As another example, the communication device 122 can generate an optical waveform. The communication device 122 can generate the optical waveform by pulsing a light emitting diode at a particular frequency. The communication device 122 can transmit the optical waveform via an optical cable (e.g., a fiber optic cable).

The computing device 120 can be in electrical communication with a display 310. The display 310 can receive signals from the processor 304 and output one or more associated images. For example, the display 310 can output a graph, such as the probability-mass distribution graph shown in FIG. 5. Examples of the display 310 can include a television, a computer monitor, a liquid crystal display (LCD), or any other suitable display device.

The computing device 120 is in electrical communication with a power source 320. The power source 320 can additionally be in electrical communication with the communication device 122, the sensor 118, or both. In some examples, the power source 320 can include a battery for powering the computing device 120, the communication device 122, or the sensor 118. In other examples, power source 320 can include an electrical cable, such as a wireline, to which the computing device 120 can be coupled.

In some examples, the power source 320 can include an AC signal generator. The computing device 120 can operate the power source 320 to apply a transmission signal to the antenna 324. For example, the computing device 120 can cause the power source 320 to apply a voltage with a frequency within a specific frequency range to the antenna 324. This can cause the antenna 324 to generate a wireless transmission. In other examples, the computing device 120, rather than the power source 320, can apply the transmission signal to the antenna 324 for generating the wireless transmission.

Figure 4:
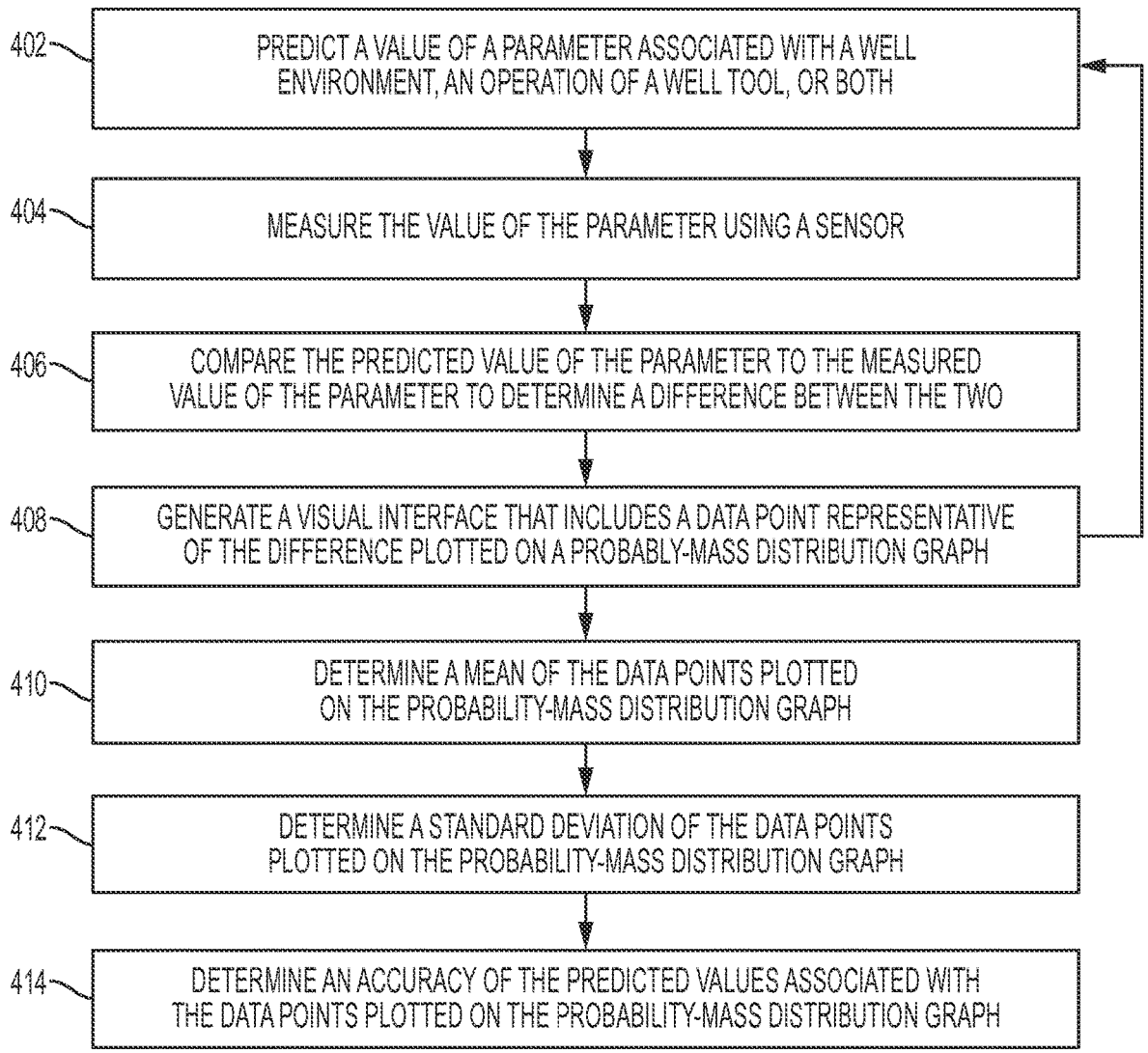
FIG. 4 is a flow chart of an example of a process for measuring the accuracy of multiple predictions according to some aspects.

FIG. 4 is a flow chart of an example of a process for measuring the accuracy of multiple predictions according to some aspects.

In block 402, the computing device 120 predicts a value of a parameter associated with a well environment, a wellbore operation, or both. For example, the computing device 120 can predict an equivalent circulating density (ECD) of a fluid in a wellbore. The computing device 120 can use one or more models and apply one or more constraints to the models to predict the parameter of the well environment, the wellbore operation, or both. Examples of the constraints can include a known type of fluid in the wellbore, a depth of the wellbore, a temperature of the wellbore, a location of the wellbore, a characteristic of a subterranean formation out of which the wellbore is drilled, or any combination of these. In some examples, a user can input the constraints into the computing device 120 and the computing device 120 can store the constraints in memory (e.g., memory 308 of FIG. 3).

In block 404, the computing device 120 measures the value of the parameter (associated with the well environment, the wellbore operation, or both) using a sensor 118. The sensor 118 can detect one or more characteristics of the well environment, the wellbore operation (e.g., the operation of a well tool), or both and transmit an associated sensor signal to the computing device 120. The sensor signal can be an analog signal or a digital signal. For example, the sensor 118 can detect a pressure while drilling (PWD) a wellbore and transmit an associated sensor signal to the computing device 120. The computing device 120 can receive the sensor signal and extract sensor data from the sensor signal.

In block 406, the computing device 120 compares the predicted value of the parameter to the measured value of the parameter to determine a difference between the two. For example, the computing device 120 can subtract the predicted ECD value from the measured PWD value to determine a difference between the two. The computing device 120 can store the difference between the two in memory.

In block 408, the computing device 120 generates a visual interface that includes a data point representative of the difference (between the predicted value of the parameter and the measured value of the parameter) plotted on a probability-mass distribution graph. The computing device 120 can output the visual interface on a display (e.g., display 310 of FIG. 3).

Figure 5:
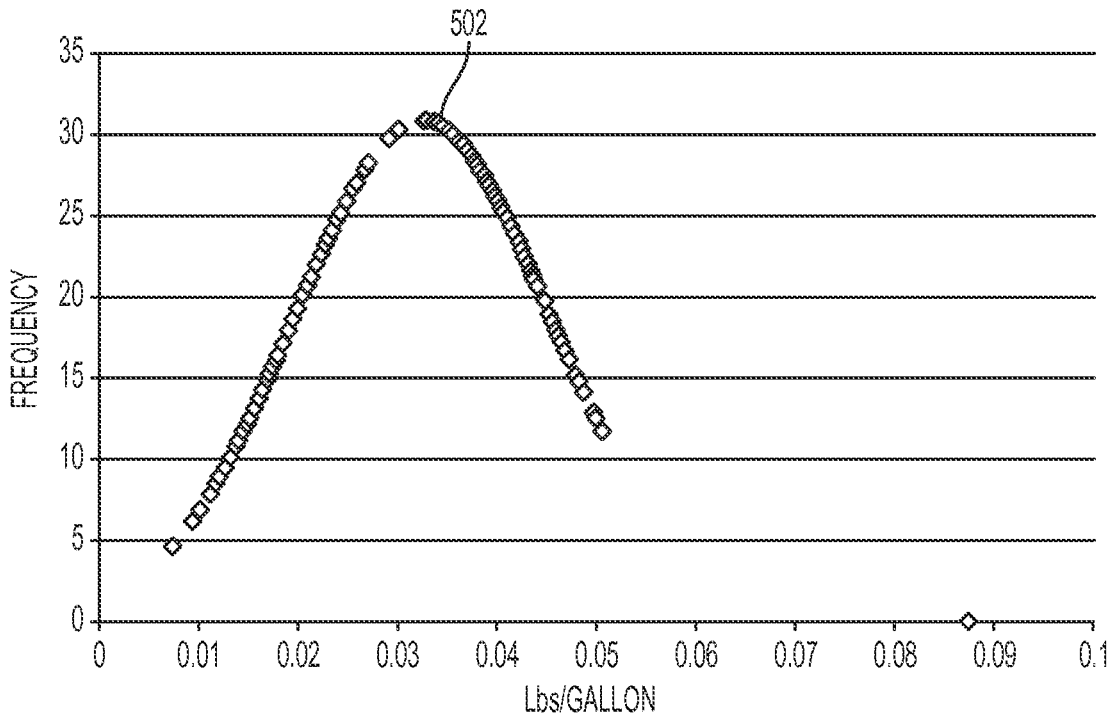
FIG. 5 is graph depicting a probability-mass distribution indicative of the accuracy of multiple predictions according to some aspects.

For example, referring to FIG. 5, the data point can be plotted along the probability-mass distribution curve 502. The process can return to block 402 and iterate the steps of blocks 402-408 to generate multiple data points and plot the data points on the probability-mass distribution curve 502. In some examples, the data points can have a substantially normal distribution. The probability-mass distribution curve 502 can represent the accuracy of predicted values associated with the data points. A well operator can visually inspect the probability-mass distribution curve 502 to determine the accuracy of the predicted values.

In block 410, the computing device 120 determines a mean of the data points plotted on the probability-mass distribution graph. For example, the computing device 120 can determine the mean of all of the data points plotted on the probability-mass distribution graph. The mean can indicate the average difference between the predicted value of the parameter and the measured value of the parameter.

For example, referring again to FIG. 5, the computing device 120 can determine that the mean of the data points plotted on the probability-mass distribution curve 502 is 0.03258 lbs/gallon. The mean can indicate that the average difference between the predicted ECD value and the measured PWD value is 0.03258 lbs/gallon.

In block 412, the computing device 120 determines a standard deviation of the data points plotted on the probability-mass distribution graph (e.g., based on the mean). For example, the computing device 120 can determine a square of a difference between each data point and the mean. The computing device 120 can then determine another mean of the squared values to determine a variance. The computing device 120 can determine a square root of the variance to determine the standard deviation. In some examples, the computing device 120 can determine a number of predicted values that fall within one, two, three, or more standard deviations from the mean.

For example, referring again to FIG. 5, the computing device 120 can determine that approximately 99.7% of the predicted ECD values are within three standard deviations from the mean. More specifically, the computing device 120 can determine that 99.7% of the predicted ECD values fall within a range between 0.0062 lbs/gallon below an associated measured PWD value and 0.0714 lbs/gallon above the measured PWD value. Thus, 99.7% of the predicted ECD values can be within 0.0388 lbs/gallon of the associated measured PWD value, which can indicate that the predicted ECD values are highly accurate.

In block 414, the computing device 120, a well operator, or both determines an accuracy of the predicted values associated with the data points plotted on the probability-distribution graph. The computing device 120, well operator, or both can determine the accuracy of the predicted values based on the probability-mass distribution graph. For example, the computing device 120 can determine that the predicted values are sufficiently accurate if the standard deviation calculated in block 412 exceeds a threshold. The computing device 120 can determine that the predicted values are not sufficiently accurate if the standard deviation calculated in block 412 falls below the threshold. In some examples, the well operator can visually inspect the probability-mass distribution graph and determine (e.g., based on the distribution of the data points) whether the predicted values are sufficiently accurate.

Figure 6:
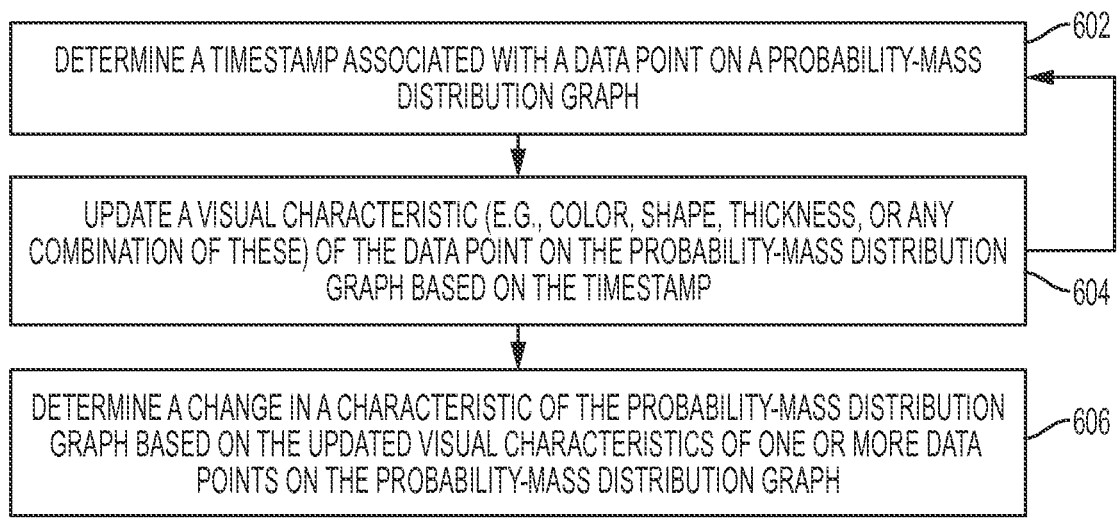
FIG. 6 is a flow chart of an example of a process for determining a change in a characteristic of a probability-mass distribution graph according to some aspects.

FIG. 6 is an example of a flow chart of a process for determining a change in a characteristic of a probability-mass distribution graph according to some aspects. Any number and combination of the blocks shown in FIG. 6 can be included in the process shown in FIG. 4.

In block 602, the computing device 120 determines a timestamp associated with a data point on a probability-mass distribution graph (e.g., the probability-mass distribution graph of block 408 of FIG. 4). For example, the computing device 120 can store a timestamp associated with the data point in memory. The computing device 120 can access the memory to retrieve the timestamp associated with the data point on the graph.

In block 604, the computing device 120 updates a visual characteristic (e.g., the color, shape, thickness, or any combination of these) of the data point on the probability-mass distribution graph based on the timestamp. The process can iterate the steps of blocks 602-604 for multiple data points (e.g., all of the data points) on the probability-mass distribution graph.

The computing device 120 can update the visual characteristic of the data point based on the age of the data point. For example, referring to FIG. 7, the computing device 120 can update a shape of the data point on the probability-mass distribution curve based on the age of the data point. Different shapes, such as shapes T1-T10, can represent different ages of various data points. The most recent data point can be plotted on the probability-mass distribution curve at time $t_1$ and can have shape T1. Data points older than a threshold time $t_{10}$ (e.g., points that are more than one minute old) can have shape T10. Data points plotted between times $t_1$ and $t_{10}$ can have shapes T2-T9. Any number and configuration of shapes, colors, or other visual indicators can be used to signify the age of one or more data points. The visual indicators of age can allow a well operator to visually inspect the graph and determine which data points are new and which data points are old.

In block 606, the computing device 120 or the well operator determines a change in a characteristic of the probability-mass distribution graph based on the updated visual characteristics of one or more data points on the probability-mass distribution graph. For example, the computing device 120 or the well operator can determine that the mean is shifting, the standard deviation is changing, or both based on the updated visual characteristics of each point on the graph.

Figure 7:
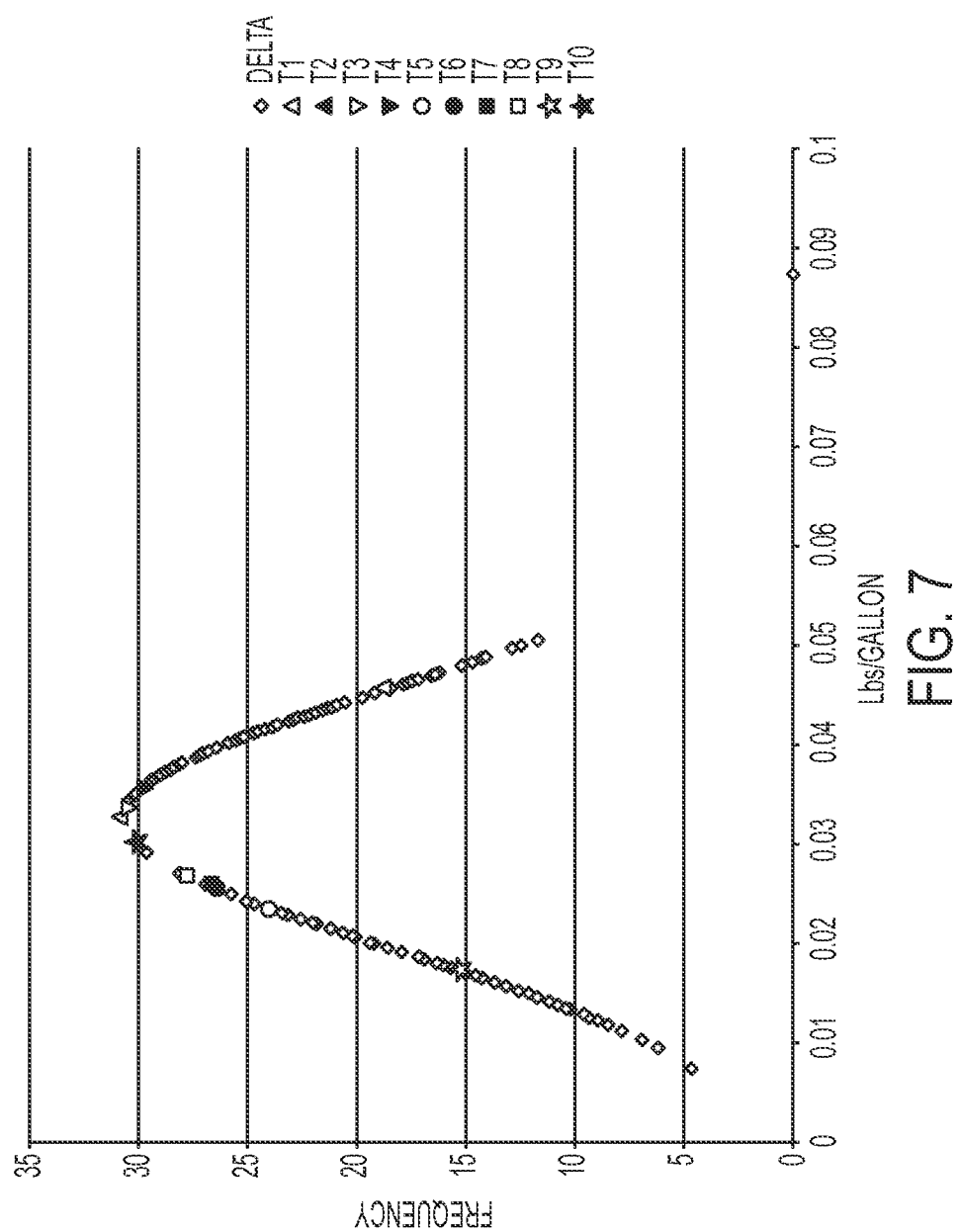
FIG. 7 is graph depicting a probability-mass distribution in which new data points are distributed around a mean of the graph and an age of a point is indicated by a shape according to some aspects.
Figure 8:
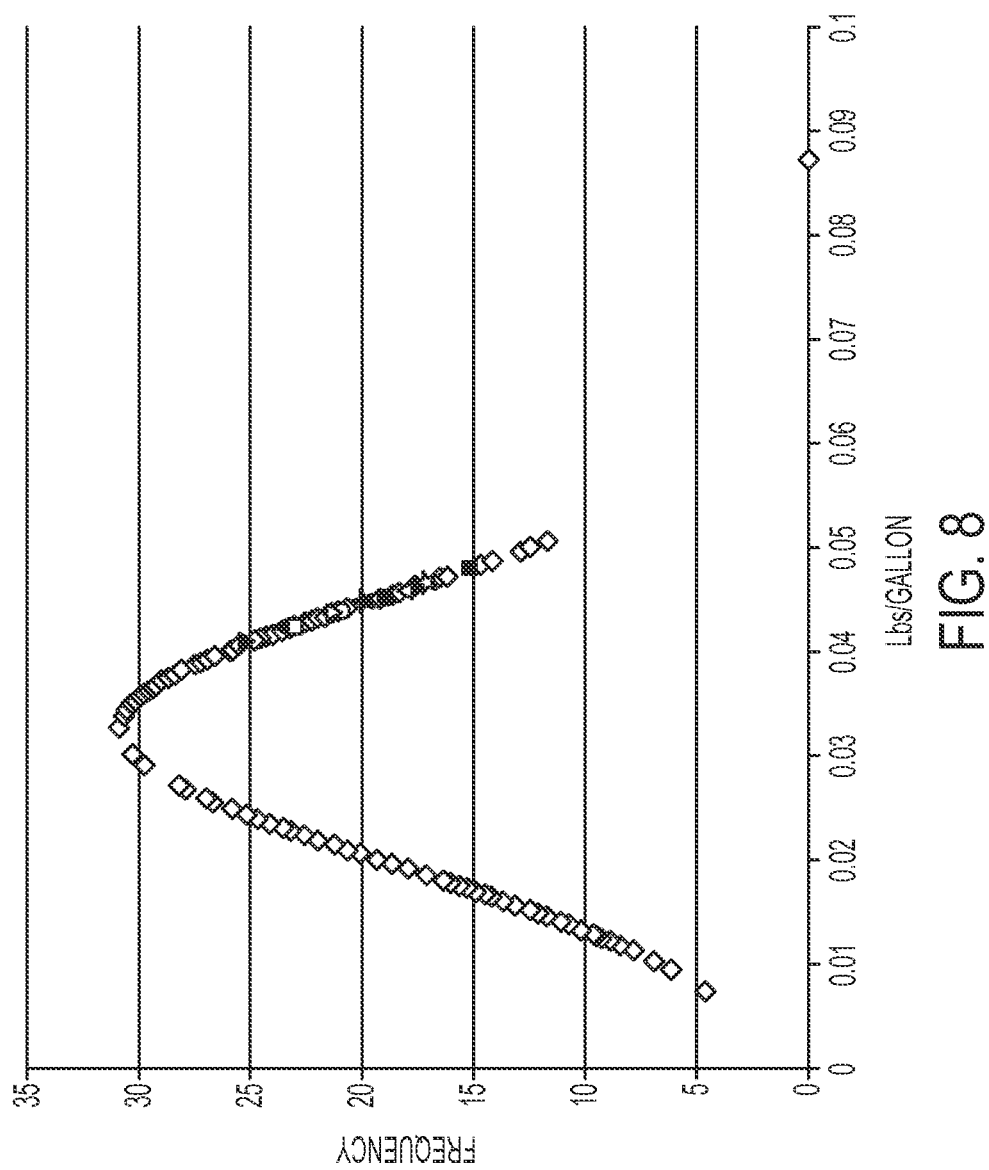
FIG. 8 is graph depicting a probability-mass distribution in which new data points are grouped on one side of a mean of the graph indicating a shift in the probability-mass distribution according to some aspects.

In some examples, new data points can be randomly distributed around the mean of the probability-mass distribution curve as the new data points are added to the probability-mass distribution curve. The distribution around the mean can indicate that a model (used to generate the predicted values) is working properly. For instance, as shown in FIG. 7, new data points are plotted on either side of the mean (0.03258 lbs/gallon) of the probability-mass distribution curve. If the model is not working properly or an event is occurring in the well system, a majority of new data points can be added to the probability-mass distribution curve on one side of the mean. Examples of an event can include a pressure drop in a wellbore, an influx of gas in the wellbore, a stuck pipe in the wellbore, or any combination of these. For example, as shown in FIG. 8, the newer data points (represented by different shapes) are plotted to the right side of the mean of the probability-mass distribution curve. The location of the newer data points can indicate that a new trend is forming in the probability-mass distribution curve or that the new data points are otherwise deviating from the current probability-mass distribution curve.

Figure 9:
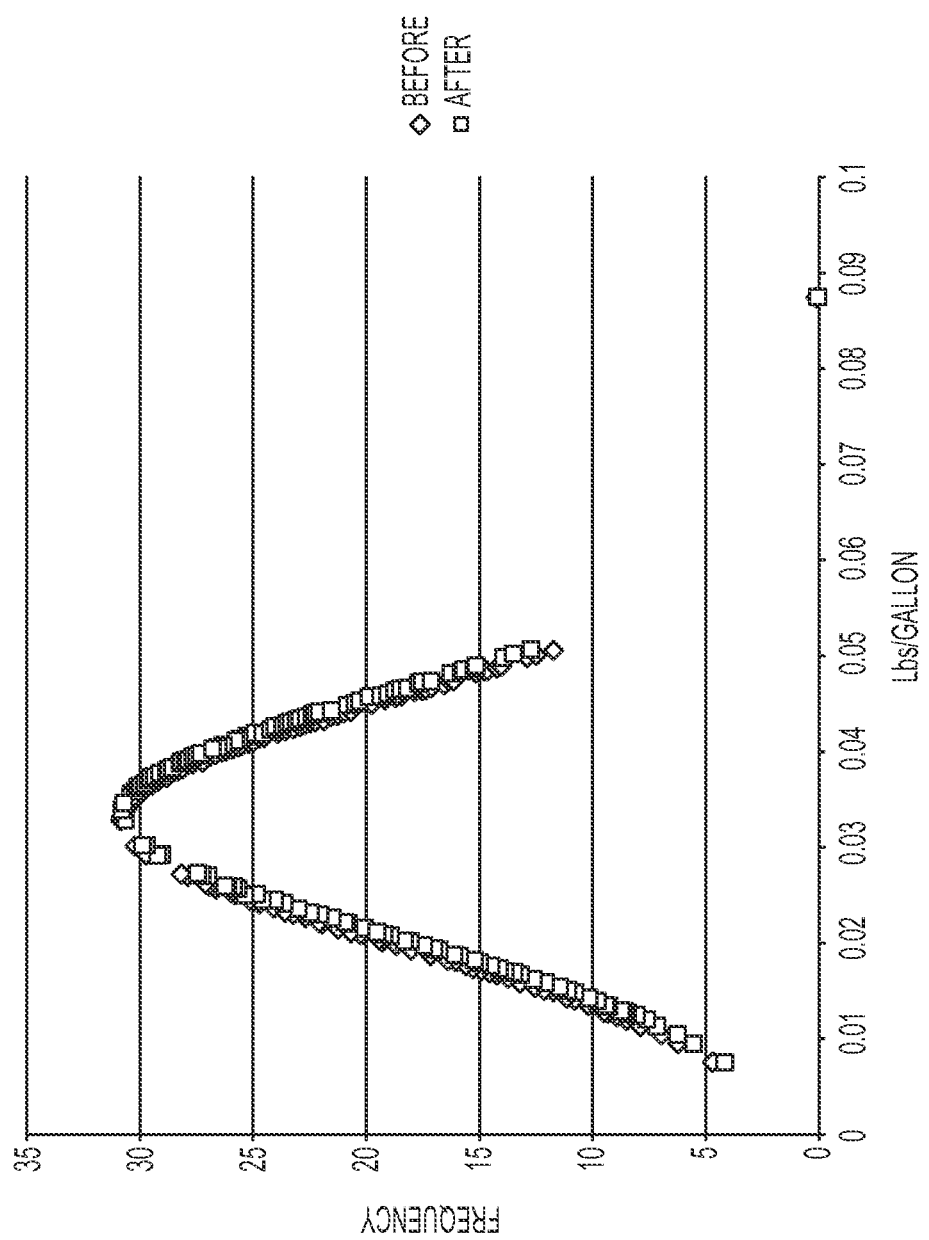
FIG. 9 is graph depicting a probability-mass distribution curve before a shift and a probability-mass distribution after a shift according to some aspects.

A well operator can visually inspect the probability-mass distribution graph and determine, based on a location of the new data points, that the model is not working properly or an event is occurring in the well system. Visual inspection of the graph can allow the well operator to determine problems in the model or events occurring downhole faster than by inspecting numerical indicators, such as a change in a standard deviation or a change in the mean of the probability-mass distribution. In some examples, the visual indicators of the ages of the data points can allow the well operator to detect slight changes in the probability-mass distribution curve that the well operator may otherwise be unable to detect. For example, FIG. 9 depicts a probability-mass distribution curve before a shift and a probability-mass distribution curve after the shift. The difference between the two probability-mass distribution curves can be slight and may be unnoticeable to a well operator. For example, the mean of the probability-mass distribution curve before the shift can be 0.03258. The mean of the probability-mass distribution curve after the shift can be 0.03336. But visual indicators of the age of the data points (e.g., the different shapes of the data points) can highlight for the well operator that the shift is occurring or has occurred.

In some aspects, systems and methods for predicting wellbore operation parameters are provided according to one or more of the following examples:

Example #1

A system for use in a wellbore can include a computing device. The computing device can include a processing device and a memory in which instructions executable by the processing device are stored. The instructions can cause the processing device to: generate a predicted value of a parameter associated with a well environment or with a wellbore operation. The instructions can also cause the processing device to receive sensor data that includes a measured value of the parameter. The instructions can also cause the processing device to compare the predicted value to the measured value to determine a difference. The instructions can also cause the processing device to generate an interface for display that includes a data point associated with the difference plotted on a probability-mass distribution graph. The system can also include a sensor in electrical communication with the computing device and positionable proximate to the wellbore for generating the measured value of the parameter and transmitting the measured value of the parameter to the computing device.

Example #2

The system of Example #1 may feature the memory device including instructions executable by the processing device for causing the processing device to generate the predicted value associated with the wellbore operation. The wellbore operation can include operating a measuring-while-drilling tool.

Example #3

The system of any of Examples #1-2 may feature the memory device further including instructions executable by the processing device for causing the processing device to determine a mean of the probability-mass distribution graph, and determine a standard deviation of the probability-mass distribution graph.

Example #4

The system of Example #3 may feature the memory device further including instructions executable by the processing device for causing the processing device to: determine that the predicted value is accurate in response to the standard deviation exceeding a threshold; and determine that the predicted value is not accurate in response to the standard deviation falling below the threshold.

Example #5

The system of any of Examples #1-4 may feature the memory device further including instructions executable by the processing device for causing the processing device to determine respective timestamps for one or more data points on the probability-mass distribution graph, and update a visual characteristic of the one or more data points on the probability-mass distribution graph based on a respective timestamp.

Example #6

The system of Example #5 may feature the visual characteristic including a color, a shape, a thickness, or any combination of these.

Example #7

The system of any of Examples #1-6 may feature the memory device further including instructions executable by the processing device for causing the processing device to generate the predicted value using a model for simulating the wellbore operation.

Example #8

A method can include generating, by a processing device, a predicted value of a parameter associated with a well environment or with a wellbore operation. The method can also include receiving, from a sensor and by the processing device, sensor data that includes a measured value of the parameter. The method can also include comparing, by the processing device, the predicted value to the measured value to determine a difference. The method can further include generating, by the processing device, an interface for display that includes a data point associated with the difference plotted on a probability-mass distribution graph.

Example #9

The method of Example #8 may feature generating the predicted value associated with the wellbore operation. The wellbore operation can include operating a measuring-while-drilling tool.

Example #10

The method of any of Examples #8-9 may feature determining a mean of the probability-mass distribution graph, and determining a standard deviation of the probability-mass distribution graph.

Example #11

The method of Example #10 may feature determining that the predicted value is accurate in response to the standard deviation exceeding a threshold. The method can also feature determining that the predicted value is not accurate in response to the standard deviation falling below the threshold.

Example #12

The method of any of Examples #8-11 may feature determining respective timestamps for one or more data points on the probability-mass distribution graph. The method may also feature updating a visual characteristic of the one or more data points on the probability-mass distribution graph based on a respective timestamp.

Example #13

The method of any of Examples #8-12 may feature determining, by a well operator visually inspecting the probability-mass distribution graph, a change in a characteristic of the probability-mass distribution graph based on a visual characteristic of one or more data points on the probability-mass distribution graph.

Example #14

The method of any of Examples #8-13 may feature generating the predicted value using a model for simulating the well environment or the wellbore operation.

Example #15

A non-transient computer readable medium can include program code that is executable by a processor to cause the processor to generate a predicted value of a parameter associated with a well environment or a wellbore operation. The program code can also be executable by a processor to cause the processor to receive sensor data, from a sensor, that includes a measured value of the parameter. The program code can also be executable by a processor to cause the processor to compare the predicted value to the measured value to determine a difference. The program code can further be executable by a processor to cause the processor to generate an interface for display that includes a data point associated with the difference plotted on a probability-mass distribution graph.

Example #16

The non-transient computer readable medium of Example #15 may feature program code executable by the processor to cause the processor to generate the predicted value associated with the wellbore operation. The wellbore operation can include operating a measuring-while drilling tool.

Example #17

The non-transient computer readable medium of any of Examples #15-16 may feature program code that is executable by the processor to cause the processor to determine a mean of the probability-mass distribution graph, and determine a standard deviation of the probability-mass distribution graph.

Example #18

The non-transient computer readable medium of Example #17 may feature program code that is executable by the processor to cause the processor to determine that the predicted value is accurate in response to the standard deviation exceeding a threshold, and determine that the predicted value is not accurate in response to the standard deviation falling below the threshold.

Example #19

The non-transient computer readable medium of any of Examples #15-18 may feature program code that is executable by the processor to cause the processor to determine respective timestamps for one or more data points on the probability-mass distribution graph, and update a visual characteristic of the one or more data points on the probability-mass distribution graph based on a respective timestamp.

Example #20

The non-transient computer readable medium of Example #19 may feature the visual characteristic including a color, a shape, a thickness, or any combination of these.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system for use in a wellbore, the system comprising:
a computing device including a processing device and a memory device in which instructions executable by the processing device are stored for causing the processing device to:
generate a predicted value of a parameter associated with a well environment or with a wellbore operation;
receive sensor data that includes a measured value of the parameter;
compare the predicted value to the measured value to determine a difference; and generate an interface for display that includes a data point representing the difference plotted on a probability-mass distribution graph, wherein the probability-mass distribution graph indicates frequencies of data-point values; and
a sensor in electrical communication with the computing device and positionable proximate to the wellbore for generating the measured value of the parameter and transmitting the measured value of the parameter to the computing device.

2. The system of claim 1, wherein the memory device comprises instructions executable by the processing device for causing the processing device to generate the predicted value associated with the wellbore operation, the wellbore operation comprising operating a measuring-while-drilling tool.

3. The system of claim 1, wherein the memory device further comprises instructions executable by the processing device for causing the processing device to:
determine a mean of the probability-mass distribution graph; and
determine a standard deviation of the probability-mass distribution graph.

4. The system of claim 3, wherein the memory device further comprises instructions executable by the processing device for causing the processing device to:
determine that the predicted value is accurate in response to the standard deviation exceeding a threshold; and
determine that the predicted value is not accurate in response to the standard deviation falling below the threshold.

5. The system of claim 1, wherein the memory device further comprises instructions executable by the processing device for causing the processing device to:
determine respective timestamps for one or more data points on the probability-mass distribution graph; and
update a visual characteristic of the one or more data points on the probability-mass distribution graph based on a respective timestamp.

6. The system of claim 5, wherein the visual characteristic comprises a color, a shape, a thickness, or any combination of these.

7. The system of claim 1, wherein the memory device further comprises instructions executable by the processing device for causing the processing device to: generate the predicted value using a model for simulating the wellbore operation.

8. A method comprising:
generating, by a processing device, a predicted value of a parameter associated with a well environment or with a wellbore operation;
receiving, from a sensor and by the processing device, sensor data that includes a measured value of the parameter;
comparing, by the processing device, the predicted value to the measured value to determine a difference; and
generating, by the processing device, an interface for display that includes a data point representing the difference plotted on a probability-mass distribution graph, wherein the probability-mass distribution graph indicates frequencies of data-point values.

9. The method of claim 8, further comprising generating the predicted value associated with the wellbore operation, the wellbore operation comprising operating a measuring-while-drilling tool.

10. The method of claim 8, further comprising:
determining a mean of the probability-mass distribution graph; and
determining a standard deviation of the probability-mass distribution graph.

11. The method of claim 10, further comprising:
determining that the predicted value is accurate in response to the standard deviation exceeding a threshold; and
determining that the predicted value is not accurate in response to the standard deviation falling below the threshold.

12. The method of claim 8, further comprising:
determining respective timestamps for one or more data points on the probability-mass distribution graph; and
updating a visual characteristic of the one or more data points on the probability-mass distribution graph based on a respective timestamp.

13. The method of claim 12, further comprising:
determining, by a well operator visually inspecting the probability-mass distribution graph, a change in a characteristic of the probability-mass distribution graph based on the visual characteristic of the one or more data points on the probability-mass distribution graph.

14. The method of claim 12, further comprising generating the predicted value using a model for simulating the well environment or the wellbore operation.

15. A non-transient computer readable medium comprising program code that is executable by a processor to cause the processor to:
generate a predicted value of a parameter associated with a well environment or a wellbore operation;
receive sensor data, from a sensor, that includes a measured value of the parameter;
compare the predicted value to the measured value to determine a difference; and
generate an interface for display that includes a data point associated with the difference plotted on a probability-mass distribution graph, wherein the probability-mass distribution graph indicates frequencies of data-point values.

16. The non-transient computer readable medium of claim 15, wherein the program code is executable by the processor to cause the processor to generate the predicted value associated with the wellbore operation, the wellbore operation comprising operating a measuring-while drilling tool.

17. The non-transient computer readable medium of claim 15, further comprising program code that is executable by the processor to cause the processor to:
determine a mean of the probability-mass distribution graph; and
determine a standard deviation of the probability-mass distribution graph.

18. The non-transient computer readable medium of claim 17, further comprising program code that is executable by the processor to cause the processor to:
determine that the predicted value is accurate in response to the standard deviation exceeding a threshold; and
determine that the predicted value is not accurate in response to the standard deviation falling below the threshold.

19. The non-transient computer readable medium of claim 15, further comprising program code that is executable by the processor to cause the processor to:
determine respective timestamps for one or more data points on the probability-mass distribution graph; and
update a visual characteristic of the one or more data points on the probability-mass distribution graph based on a respective timestamp.

20. The non-transient computer readable medium of claim 19, wherein the visual characteristic comprises a color, a shape, a thickness, or any combination of these.

* * * * *